(12) United States Patent
Crisafulli

(10) Patent No.: US 7,468,564 B2
(45) Date of Patent: Dec. 23, 2008

(54) AIR TURBINE GENERATOR

(75) Inventor: Donald M. Crisafulli, Silver Spring, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 194 days.

(21) Appl. No.: 11/699,317

(22) Filed: Jan. 29, 2007

(65) Prior Publication Data

US 2008/0178586 A1 Jul. 31, 2008

(51) Int. Cl.
*F02B 33/34* (2006.01)
*F02D 29/06* (2006.01)

(52) U.S. Cl. .............................. 290/52; 290/43; 60/608
(58) Field of Classification Search ................. 290/43, 290/44, 52, 54, 55; 60/608, 606, 609
See application file for complete search history.

(56) References Cited

U.S. PATENT DOCUMENTS

| | | | |
|---|---|---|---|
| 4,344,138 A | 8/1982 | Frasier | |
| 5,267,473 A | 12/1993 | Bezos et al. | |
| 5,536,076 A | 7/1996 | Honold | |
| 5,553,454 A | 9/1996 | Mortner | |
| 6,032,459 A * | 3/2000 | Skowronski | 60/39.511 |
| 6,036,282 A | 3/2000 | Clarke et al. | |
| 6,054,838 A | 4/2000 | Tsatsis | |
| 6,107,692 A | 8/2000 | Egri et al. | |
| 6,236,185 B1 | 5/2001 | Hines et al. | |
| 6,255,743 B1 * | 7/2001 | Pinkerton et al. | 290/40 C |
| 6,294,842 B1 * | 9/2001 | Skowronski | 290/7 |
| 6,512,305 B1 * | 1/2003 | Pinkerton et al. | 290/52 |
| 6,815,840 B1 | 11/2004 | Aldendeshe | |
| 6,838,778 B1 | 1/2005 | Kandil et al. | |
| 6,917,858 B2 | 7/2005 | Boger | |
| 7,096,096 B2 | 8/2006 | Kane et al. | |
| 7,227,274 B2 * | 6/2007 | Berkson | 290/40 R |
| 7,367,189 B2 * | 5/2008 | Ishiwatari | 60/608 |
| 2006/0005738 A1 | 1/2006 | Kumar | |

* cited by examiner

*Primary Examiner*—Nicholas Ponomarenko
(74) *Attorney, Agent, or Firm*—The Webb Law Firm

(57) ABSTRACT

An electrical power supply system comprises an air-powered alternating current electrical generator in which pressurized air from a single source is used to drive an air turbine secured on the shaft of the alternating current electrical generator. One uncontrolled nozzle continuously directs air from the single source to the air turbine. At least a second controlled nozzle directs air from the single source. A solenoid-controlled shutoff valve is placed in a conduit between the source of compressed air and the second nozzle.

12 Claims, 2 Drawing Sheets

AIR TURBINE GENERATOR

BACKGROUND OF THE INVENTION

1. Field of the Invention

This invention relates to an electrical power supply comprising an air turbine driven generator, rectifier and filter, DC-DC converter and a controller. The source of air for the air turbine is a railcar brake pipe. The controller controls the volume of air used to drive the turbine in response to changes in the required output voltage of the rectifier and filter.

2. Description of Related Art

It is known to provide an EOT (end-of-train) electrical power supply using air flow provided from the brake pipe which is a pressurized pipe that runs the length of the train consist for controlling and applying the brakes along the train consist. Such power supplies are illustrated in U.S. Pat. No. 5,267,473 entitled "Self Powered End of Train Unit" and U.S. Pat. No. 6,236,185 entitled "Compressed Air Power Supply/Rechargeable Battery Pack." It is also known to increase the amount of air supplied from multiple independent storage tanks for air under pressure to an air turbine that drives a generator when increased power is desired as taught in U.S. Pat. No. 5,553,454 entitled "Compressed Air Engine System and Method for Generating Electrical Energy From the Controlled Release of Compressed Air."

SUMMARY OF THE INVENTION

Briefly, according to one embodiment of this invention, there is provided an electrical power supply system comprising an air-powered alternating current electrical generator in which pressurized air from the brake pipe or other single source is used to drive an air turbine secured on the shaft of the alternating current electrical generator. This system is particularly suitable for an EOT power supply wherein the single source of pressurized air is the brake pipe. One uncontrolled nozzle continuously directs air from the brake pipe or other source to the air turbine. At least a second controlled nozzle directs air from the brake pipe or other source to the air turbine when required. A solenoid-controlled shut-off valve is placed in a conduit between the source of compressed air and the second nozzle. A rectifier and filter circuit converts the alternating current output of the generator to a DC voltage. A DC-DC converter connected to the output of the rectifier and filter circuit provides a DC output voltage appropriate to the intended load. A controller implemented as an electronic comparator circuit receives a voltage feedback signal taken from the output of the rectifier and filter circuit, whereby when the value of the voltage feedback signal falls below a reference signal, the comparator/controller produces a drive signal that actuates the solenoid-controlled shut-off valve to direct air from the second nozzle to the air turbine, thereby increasing the alternator output voltage to compensate for the initiating voltage drop.

According to a preferred embodiment, the alternator is a three-phase permanent magnet alternator and the comparator/controller may be provided with hysteresis such that the shut-off valve does not open and close at the same feedback signal value.

According to an alternate embodiment, the comparator/controller additionally receives a feedback signal indicative of the pressure of the single source and when the value of the brake pipe pressure drops below a reference value the comparator/controller produces a drive signal that actuates the controlled shut-off valve to direct air from the second nozzle to the air turbine.

BRIEF DESCRIPTION OF THE DRAWINGS

Further features and other objects and advantages will become apparent from the following detailed description of the preferred embodiments made with reference to the drawings in which.

DESCRIPTION OF THE PREFERRED EMBODIMENTS

Figure 1:
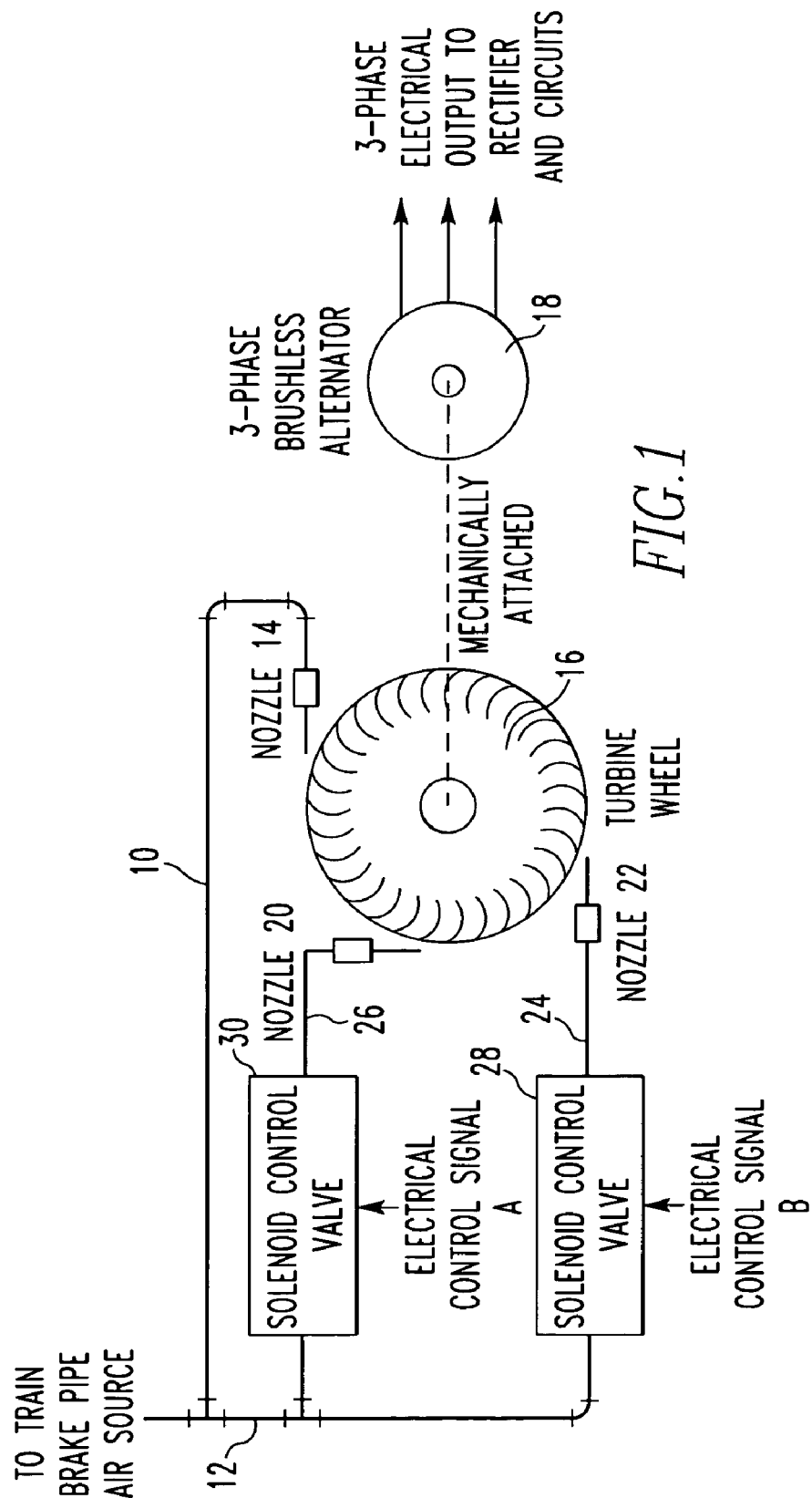
FIG. 1 is a schematic diagram of the compressed air supply circuits for driving an air turbine according to this invention also showing the relationship of the air turbine and the generator according to one embodiment of this invention.

Referring to FIG. 1, a conduit 10 from the brake pipe 12 is connected to first nozzle 14 which directs compressed air from the brake pipe or other single source of compressed air to an air turbine 16 fixed on the shaft of an alternating current generator 18 which may be a three-phase permanent magnet alternator. Additional nozzles 20 and 22 are shown directing air to the air turbine 16. These nozzles are connected to the brake pipe 12 by conduits 24 and 26 which have solenoid-controlled shut-off valves 28 and 30 between the brake pipe and the air turbine. These nozzles provide additional air to the air turbine in response to separate electrical control signals A and B provided by appropriate controllers which may be of the comparator/controller type. In an alternate embodiment, pressure switches connected to the brake pipe provide the electrical control signals.

At least one nozzle is permanently connected to the brake pipe or source of air. Additional nozzles are positioned around the circumference of the turbine and can be activated sequentially (or as otherwise required) by separate solenoid valves (or pressure switches) when higher electrical output power is required which may be the result of an increased electrical load or a decrease in the brake pipe pressure.

Figure 2:
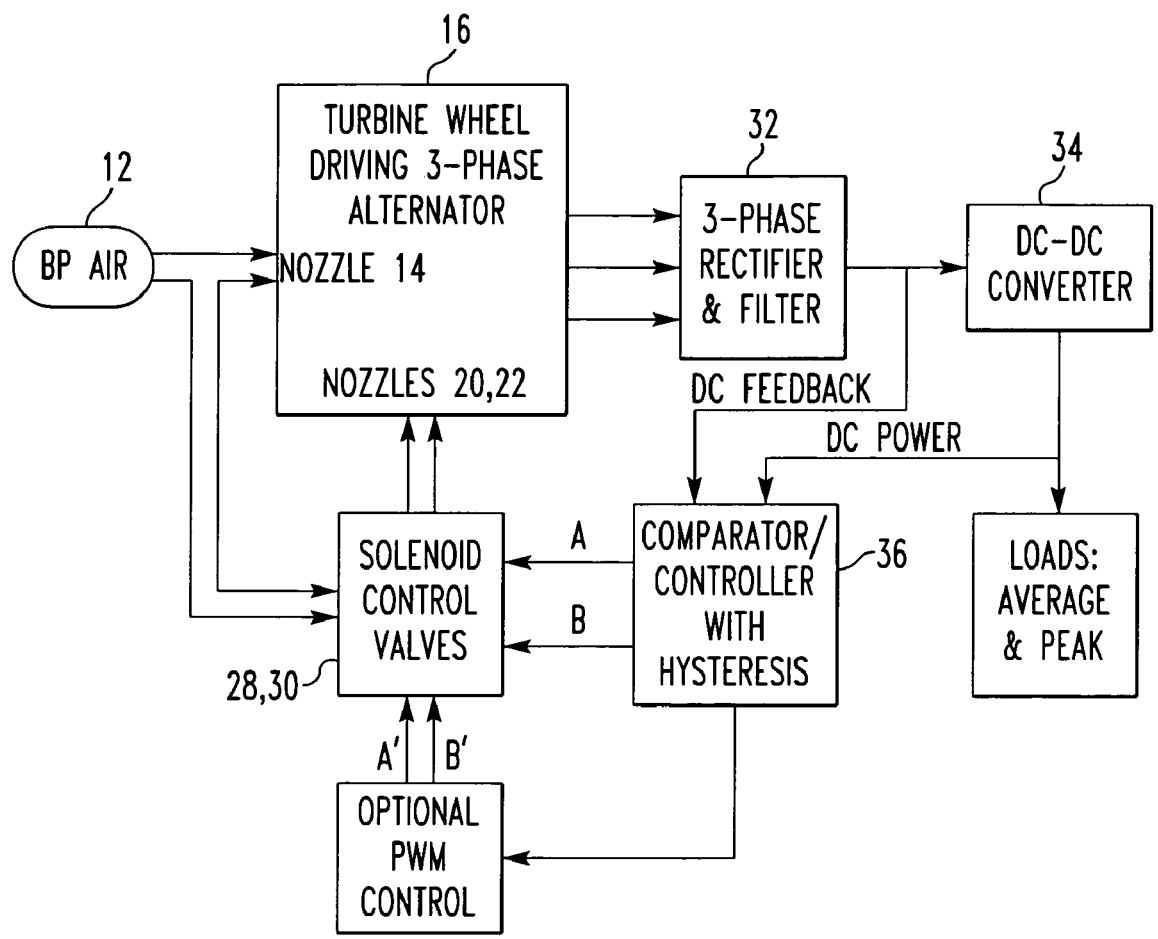
FIG. 2 is a schematic diagram for describing the control scheme of the air turbine generator according to one embodiment of this invention.

Referring now to FIG. 2, a control system is illustrated schematically. The air turbine driven three-phase alternator delivers its electrical power to a three-phase rectifier and filter 32 which, in turn, delivers its DC power to a DC-DC converter 34. The voltage output of the rectifier and filter 32 will vary depending on the speed at which the alternator is driven and the power demands of the load. The DC-DC converter 34 delivers a DC voltage in a range appropriate to the loads being driven by the air turbine system. The output of the DC-DC converter is applied to the load characterized by average and peak power requirements. For an EOT power supply, the average power may be a few watts and the peak power may be over 20 watts.

A feedback signal proportional to the DC output level of the rectifier and filter 32 is applied to the comparator/controller 36. According to one embodiment, a feedback signal is compared to reference signals and in response to the value of the feedback signal falling below the reference signals, a drive signal or signals are output from the comparator/controller for causing the solenoid valves 28, 30 to open or close.

There is a proportional relationship between the mass air flows through the nozzles and the total electric power that can be developed by the air turbine generator system. Any increase in mass air flow increases the rotational speed of the turbine and alternator and hence the mechanical power delivered to the alternator. This increase in mechanical power input results in an increase in electrical power output when the load demand is high or alternatively acts to compensate for a naturally occurring drop in power output when there is a reduction in the brake pipe pressure, or both.

In an alternate embodiment, a plurality of nozzles is controlled by a plurality of shut-off valves. Each additional nozzle is controlled by a separate shut-off valve. The additional nozzles allow the mechanical output power to step to a new level and thus be matched to the various power demands of the switched electrical loads, such as are used with the EOT device or other electrically-operated device used on a train car.

There are, of course, limitations to the amount of brake pipe air consumption allowed by railroads and regulating authorities for non-braking purposes. Increased EOT power demand requires more brake pipe air consumption. Thus, when the solenoid valve is activated because increased EOT power is required, the power consumed by the solenoid valve itself reduces the additional power available at the higher air flow. Pulse Width Modulation (PWM) control of the solenoid valve is one method to substantially reduce the power used by the solenoid valve, typically by 50% or more. PWM is a well-known technique for controlling solenoids, and depends on the fact that after a brief initial activation at full power, solenoids will "hold" their operated state at typically 50% or less of full DC power. The PWM signal is a high frequency square wave which is applied after initial operation of the solenoid by a DC signal. The DC signal to initially operate the solenoid is very short, perhaps 50 to 100 milliseconds. After this period, the DC signal switches to the PWM signal at a 70% or lower duty cycle. Since this PWM signal is at full voltage for 70% of its period and at zero volts for the other 30%, the solenoid power consumption is reduced to 49% of its DC value, or only 2.45 watts for a 5 watt solenoid.

In an alternate embodiment, the solenoid-controlled valves are controlled by a pressure responsive switch which will activate the valves when the brake pipe pressure is lower than predetermined target values. Again, the purpose is to increase the air flow and, hence, the output power required.

The present invention can be practiced with different types of nozzles. In one embodiment, a nozzle block with a curved side matching a short portion of the circumference of the turbine blade wheel has a circular orifice positioned to deliver air tangentially to the turbine blades causing the turbine blade wheel to rotate. Alternatively, the nozzle may be tubular and positioned to direct air tangentially at the turbine blade wheel to cause rotation. The nozzle may also be of the air-entraining type which has openings placed along the nozzle to admit air which then mixes with the brake pipe air which serves to increase the mass flow and thereby increase the potential speed and output power of the generator. In still another embodiment, the nozzle can be a commercially available "blow off" nozzle, such as Model MJ4 from Silvent AB, Sweden. Also, nozzle types can be mixed as required to match air consumption to the power requirements of the electrical loads.

The function of the comparator/controller may be implemented in various ways. For example, it may include a programmed microcontroller or it may be a pressure responsive switch supplying analog or digital inputs and outputs and appropriate input and output amplifiers. It may be programmed, for example, to directly measure the brake pipe pressure and/or to monitor other EOT system signals to determine from the inputs when nozzles should be turned on and off to compensate for changes in EOT power demand, electrical loading, and/or brake pipe pressure changes and/or other activities. In the illustrated embodiment, at least two nozzles are used, one permanently connected to the source of air pressure, such as the brake pipe, and another switched to the brake pipe under control of the comparator/controller. The filtered output of the rectifier and filter is input to the DC-DC converter to provide voltage at a value suitable to the average and peak power demands to be served in EOT or other systems. Also, the filtered output voltage is connected to the controller/comparator as a feedback signal to determine when air flow to a controlled nozzle should be applied or removed.

Solenoid control valves are available in both normally open and normally closed types as referenced to their non-activated state. Either type of valve can be used. With a normally closed solenoid valve, the comparator/controller is designed to activate the valve when the alternator output is lower than required. Once the valve is activated, the additional mass flow of air supplied through the second nozzle quickly increases the speed of the alternator and the voltage and power output. Since the solenoid-controlled valve is also powered by the output of the DC-DC converter, there will be a short delay at turbine start-up before the solenoid valve can be activated. During this delay, the alternator output voltage is increased to the threshold input voltage of the DC-DC converter.

In a preferred embodiment, the comparator/controller is implemented as a voltage level detector circuit which compares the rectified and filtered alternator output voltage with a stable reference voltage. The output of the voltage comparator/controller is then amplified to switch the control valve on and off as determined by the state of the comparator/controller. Since the alternator output varies with the amount of power supplied by the DC-DC converter, a drop in voltage signifies additional load demand by the devices being supplied power, such as EOT devices and/or a reduction in brake pipe pressure.

The DC-DC converter will absorb small changes in alternator output due to its inherent ability to regulate its output. According to a preferred embodiment, the turn on and turn off levels of the comparator/controller are set at different voltage levels in order to introduce hysteresis into the control loop. This hysteresis serves to introduce a "dead band" within which changes in alternator output do not change the output of the comparator/controller. This prevents rapid cycling on and off of the solenoid valve.

The invention claimed is:

1. An electrical power supply system comprising:
   an air-powered alternating current electrical generator in which pressurized air from a single source of variable pressure is used to drive an air turbine secured on the shaft of the alternating current electrical generator, there being one nozzle continuously directing air from the single source to the air turbine and at least a second nozzle directing air from the single source to the air turbine being in series with a solenoid-controlled shut-off valve;
   a rectifier and filter circuit for converting the alternating current output of the generator to a DC voltage;
   a DC-DC converter connected to the output of the rectifier and filter circuit for providing a DC output voltage appropriate to the intended load; and
   a comparator/controller receiving a voltage feedback signal taken from the output of the rectifier and filter circuit, whereby when the value of the voltage feedback signal falls below a reference signal, the comparator/controller produces a drive signal that actuates the controlled shut-off valve to direct air from the second nozzle to the air turbine.

2. An electrical power supply system according to claim 1, wherein the alternator is a three-phase permanent magnet alternator or DC generator.

3. An electrical power supply system according to claim 1, wherein the comparator/controller is provided with hysteresis such that the shut-off valve does not open and close at the same feedback signal value.

4. An electrical power supply system according to claim 1, wherein the single source is a brake pipe on a rail car.

5. An electrical power supply system according to claim 1, wherein when the value of the voltage feedback signal falls below any of a plurality of reference signals, the comparator/controller produces a drive signal that actuates one of a plurality of controlled shut-off valves to direct air from an additional nozzle to the air turbine.

6. An electrical power supply system according to claim 1, wherein there is a PWM amplifier in series with the solenoid-controlled shut-off valve for reducing the current to the shut-off valve after it has been actuated to a level sufficient to maintain its condition.

7. An electrical power supply system according to claim 1, wherein the control circuit receives a feedback signal indicative of the single source pressure and when the value of the pressure drops below a reference value, the comparator/controller produces a drive signal that actuates the controlled shut-off valve to direct air from the second nozzle to the air turbine.

8. An electrical power supply system comprising:
   an air-powered alternating current electrical generator in which pressurized air from the brake pipe of a rail car is used to drive an air turbine secured on the shaft of the alternating current electrical generator, there being one nozzle continuously directing air from the brake pipe to the air turbine and at least a second nozzle directing air from the brake pipe to the air turbine being in series with a solenoid-controlled shut-off valve;
   a rectifier and filter circuit for converting the alternating current output of the generator to a DC voltage;
   a DC-DC converter connected to the output of the rectifier and filter circuit for providing a DC output voltage appropriate to the intended load; and
   a comparator/controller receiving a feedback signal indicative of the brake pipe pressure and when the value of the brake pipe pressure drops below a reference value, the comparator/controller produces a drive signal that actuates the controlled shut-off valve to direct air from the second nozzle to the air turbine.

9. An electrical power supply system according to claim 8, wherein the alternator is a three-phase permanent magnet alternator or DC generator.

10. An electrical power supply system according to claim 8, wherein the comparator/controller is provided with hysteresis such that the shut-off valve does not open and close at the same feedback signal value.

11. An electrical power supply system according to claim 8, wherein when the value of the voltage feedback signal falls below any of a plurality of reference values, the comparator/controller produces a drive signal that actuates one of a plurality of controlled shut-off valves to direct air from an additional nozzle to the air turbine.

12. An electrical power supply system according to claim 8, wherein there is a PWM amplifier in series with the solenoid-controlled shut-off valve for reducing the current to the shut-off valve after it has been actuated to a level sufficient to maintain its condition.

* * * * *